United States Patent [19]

Leichle

[11] 4,003,248

[45] Jan. 18, 1977

[54] FAULTY COMBUSTION DEVICE FOR CONTROLLED IGNITION INTERNAL COMBUSTION ENGINE

[75] Inventor: Claude Leichle, Le Pecq, France

[73] Assignees: Regie Nationale des Usines Renault, Boulogne-Billancourt; Automobiles Peugeot, Paris, both of France

[22] Filed: Feb. 19, 1975

[21] Appl. No.: 551,453

[30] Foreign Application Priority Data

Feb. 20, 1974 France .................... 74.05778

[52] U.S. Cl. ............................................. 73/116
[51] Int. Cl.² ....................................... G01M 15/00
[58] Field of Search ............. 73/116, 35; 250/281; 324/16 R, 17

[56] References Cited

UNITED STATES PATENTS

| | | | |
|---|---|---|---|
| 3,286,164 | 11/1966 | Huff | 324/17 X |
| 3,289,462 | 12/1966 | Wostl | 73/35 |

Primary Examiner—Jerry W. Myracle
Attorney, Agent, or Firm—Beveridge, De Grandi, Kline & Lunsford

[57] ABSTRACT

An apparatus and method for detecting faulty combustion in an internal combustion engine. The series combination of a voltage source and a resistor are connected across the electrodes of a spark plug and the magnitude and shape of the voltage waveform across the resistor is indicative of whether or not a spark has occurred and whether or not combustion has occurred. An electronic processing circuit is provided for actuating an alarm or affecting the operations of some part of the engine or automobile when it is determined either that a spark has not occurred at the proper time or that a predetermined minimum number of consecutive sparks has occurred without the occurrence of combustion.

8 Claims, 4 Drawing Figures

FAULTY COMBUSTION DEVICE FOR CONTROLLED IGNITION INTERNAL COMBUSTION ENGINE

BACKGROUND OF THE INVENTION

This invention relates to a device for detecting faulty combustion in a controlled-ignition internal combustion engine.

Because of recently passed regulations setting standards of purity for the combustion gases from internal combustion or heat engines, it has become necessary to use purifying devices for processing the exhaust gases. These devices are expensive and are very easily damaged in the event of faulty operation of the engine, since an increase in the content of gases to be eliminated results in an excessive increase in the temperature of the reacting means used in the purifying devices, which consequently melt and are destroyed.

Prior art protection devices detect the temperature of the means to be protected and operate when the temperature rises abnormally. The devices have two disadvantages. Firstly, the inertia of temperature detectors is an obstacle to effective protection and, secondly, they detect, not faulty operation but one of the results thereof. In principal, therefore, the detection occurs some time after the actual event.

In the case of faulty combustion, the actual event occurs at the combustion chamber. Faults are of the following two types: A failure in the ignition spark or unsuitable richness of the gaseous mixture, resulting in faulty combustion of the mixtures; or an absence of a spark, and consequently of combustion.

The object of the invention, therefore, is to provide a device for detecting the aforementioned faults in combustion, the detection occurring as soon as the faults occur, so that protection can be rapid.

Another object of the invention is to provide exact detection, i.e. means capable of detecting faults having a number of levels of seriousness so that various forms of protection can be used, varying from a change in engine operation (which is performed in a simple manner by the driver so that the vehicle can automatically go to a garage to undergo the necessary repairs without endangering the purifying devices) up to a total shutdown if a fault resulting in rapid destruction is detected, via intermediate methods of purification (such as by-passing, cutting off the supply of air, and so on).

Another object of the invention is to provide a detecting device which is independent of the operating conditions of the engine and provides uniform protection during the entire operating cycle of the vehicle.

Another object of the invention is to provide a simple device which does not require any additional ionization pick-up.

Another object of the invention is to provide a device which does not in any way impair the intrinsic qualities of the ignition device but which on the contrary may increase the performance thereof, by providing information which can be used in a process comprising a feedback such as a regulation of the composition of the gaseous mixtures, etc.

The invention is based on the fact that the combustion of a gaseous mixture results in ionization thereof. This well-known phenomenon is at present used for measurements relating to combustion. When the mixture in the combustion chamber burns, it is strongly ionized and acquires the characteristics of an electric conductor.

The device according to the invention makes use of ionization which occurs in the inter-electrode space in the spark plug, by supplying the spark plug with a current supplied by an auxiliary generator. Accordingly, the presence or absence of the aforementioned current indicates both whether the spark is present and the quality of combustion. A signal corresponding to the current is sampled at the terminals of a resistor connected in the electric circuit of the spark plug, and the signal is conveyed to an electronic processing unit whose output signal can actuate various devices for protecting the purifying means and/or can regulate the combustion process if necessary, by injecting the signal into a feedback loop for regulating the composition of gases fed to the engine.

The invention will be more clearly understood from the following detailed description of a non-limitative embodiment shown in the accompanying drawings, in which.

Figure 1:
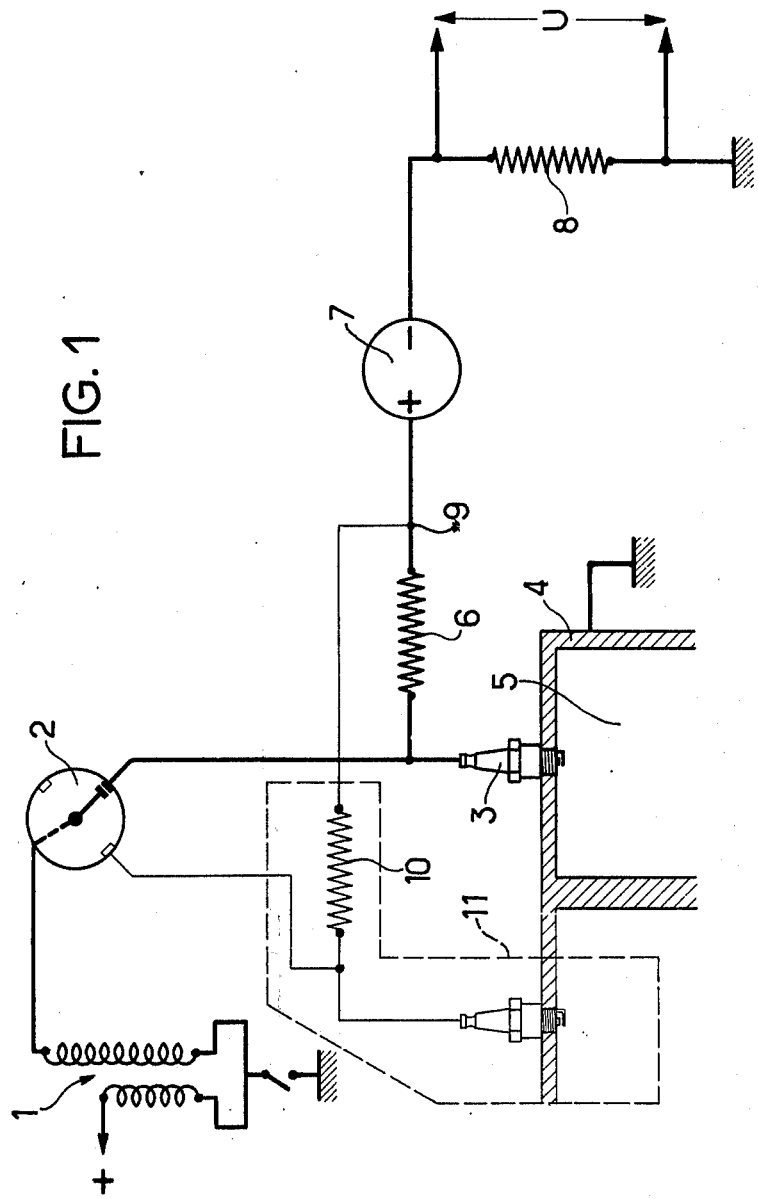
FIG. 1 shows the detection circuit proper according to the invention.

As FIG. 1 shows, the detection circuit proper is connected to the engine ignition circuit without modifying the ignition circuit. The ignition circuit comprises an induction coil 1 producing the required high voltage and connected in known manner to a distributor 2 which, also in known manner, directly supplies the various spark plugs. We shall first consider spark plug 3 secured to engine unit 4, and the combustion chamber 5 of the cylinder corresponding to spark plug 3 and containing the gaseous mixture to be ignited.

According to the invention, the connection between distributor 2 and the central electrode of spark plug 3 is connected to a series circuit comprising a resistor 6 having a sufficiently high value not to interfere with the operation of the ignition circuit, a high-voltage source 7 having a value preferably less than half the high voltage supplied by the ignition circuit but greater than approximately 500 V and connected with appropriate polarities, and a resistor 8 for measuring the current which may flow in the series circuit and which thus cooperates with the ionized space between the electrodes of the spark plug 3 to form a closed-loop electric circuit. The measurement is made by determining the voltage U at the terminals of resistor 8.

Faulty combustion can similarly be detected in each engine cylinder, simply by connecting point 9 (the common point of resistor 6 and generator 7) to the central electrode of each corresponding spark plug via a resistor such as 10 corresponding to resistor 6 as shown in FIG. 1. Information from all the cylinders involved is at the terminals of resistor 8, which is common to all the present cylinders. In theory, there is no limit to the number of cylinders which can be connected to the device.

Figure 2:
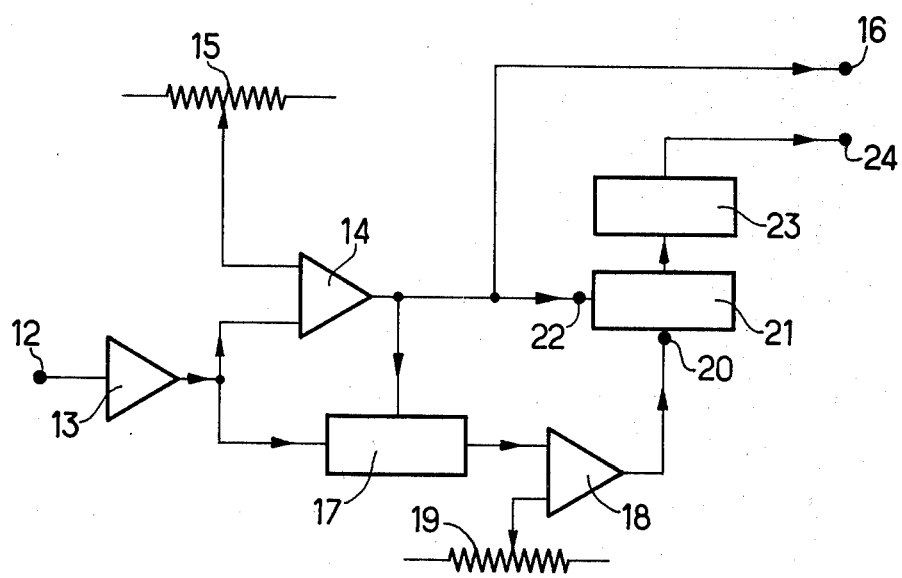
FIG. 2 is a block diagram of an electronic device for processing the signal from the detector in FIG. 1 and adapted to detect faulty combustion.

FIG. 2 diagramatically shows a device for processing the signal coming from the detector in FIG. 1 and sampled at the terminals of resistor 8.

The signal from the detector is conveyed to input 12 of an amplifier 13 which shapes the signal and separates it from interfering signals. The output signal of amplifier 13 is sent to a comparator 14 which adjusts the reference voltage in a manner shown diagrammatically by a potentiometer 15. Comparator 14 emits a signal when the voltage sent to terminal 12 exceeds a certain value U1 which can be regulated by potentiometer 15. The output signal of comparator 14 is available at an output terminal 16.

The output of amplifier 13 is also connected to an inhibiting device 17 which is actuated by comparator 14 and which acts as a logic gate. The output signal of device 17 is conveyed to a second comparator 18 which adjusts the reference voltage in a manner diagrammatically shown by a potentiometer 19. The second comparator 18 emits an output signal when the voltage sent to terminal 12 exceeds a given second value U2, which is determined by means of potentiometer 19.

The output of comparator 18 is connected to the zero-resetting input 20 of a counter 21 which counts the signals from comparator 14, which are conveyed to its counting input 22.

Counter 21 is connected to a decoder 23 which decodes its contents and emits a signal at its output 24 when the contents of counter 21 exceeds a given value.

Figure 3:
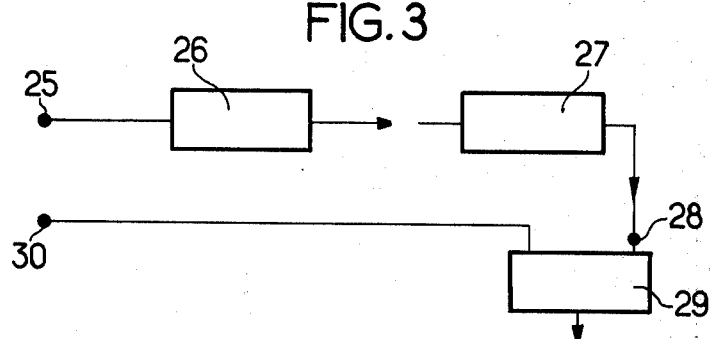
FIG. 3 is a block diagram of an electronic processing device which can be connected to the device in FIG. 2 and which is adapted to detect the absence of a spark, and FIG. 4 diagrammatically shows the voltage at the terminals of the measuring resistor in the detection circuit shown in FIG. 1.

FIG. 3 diagrammatically shows a device for detecting the absence of a spark, and which receives the signals from the output terminals 16, 24 of the device in FIG. 2.

The signal from comparator 14, which appears at the output terminal 16, is conveyed to the input terminal 25 of a monostable multivibrator 26 which supplies a pulse having a duration D and which is triggered every time a signal appears at terminal 16. The duration D may be adjusted in accordance to the speed of rotation of the engine, or may simply be adjusted to a minimum rotation speed, so as to be slightly greater than the time between two successive ignitions of a single spark plug; in the case where D is determined in accordance with the minimum speed of rotation, it is of the order of 1 to 2 s, which is negligible compared with the response times of protecting devices, which usually vary from 10 to 20 s.

The output of monostable multivibrator 26 is connected to the input of a detector 27 which outputs a signal when multivibrator 26 has not been triggered for a duration greater than D.

The output of detector 27 is connected to one input 28 of an operating circuit 29 whose other input 30 is directly connected to the output terminal 24 of the device in FIG. 2. The operating circuit provides an OR logic function and may if required comprise a suitable output amplifier for actuating alarm devices, protective devices or feedback circuits for adjusting the ignition circuit or the composition of the gaseous mixture.

Figure 4:
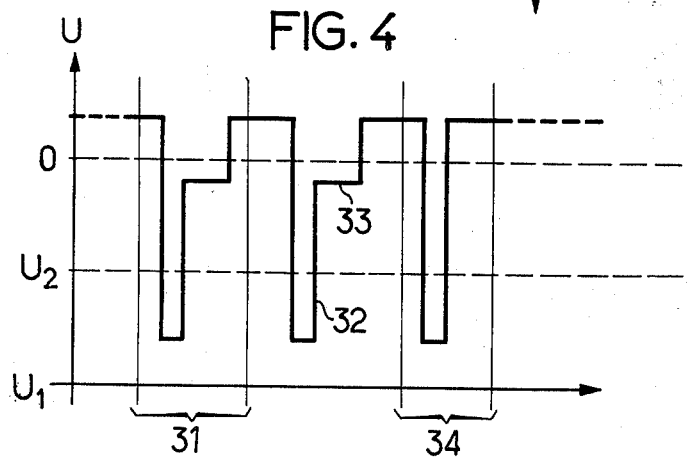

We shall now describe the operation of the device according to the invention with reference to FIG. 4, which shows the shape of the signal U appearing at the terminals of resistor 8, in dependence on the time $t$.

When the gaseous mixture burns in a normal manner, the signal obtained has the appearance shown at 31 in FIG. 4, and is divided into two parts; a narrow pulse 32 corresponding to the spark produced at the electrodes of spark plug 3, and a plateau 33 corresponding to the flow of a current which is supplied by generator 7 (FIG. 1) and which cannot flow unless the mixture in combustion chamber 5 is ionized, i.e. burnt. Accordingly, plateau 33 indicates combustion.

If the signal has the shape shown at 34, there has been a spark but no combustion.

The processing device shown in FIG. 2 is adapted to detect the appearance of $n$ successive sparks not resulting in combustion. After the signal reaching terminal 12 has been shaped by amplifier 13, the resulting signal is applied on the one hand to comparator 14, which isolates a pulse having an appearance similar to that shown at 32, and on the other hand to comparator 18 via the inhibiting circuit 17. Circuit 17, which is actuated by comparator 14, shuts off comparator 18 during the duration of the spark, thus isolating and detecting the signal in the form of a plateau 33 (combustion) at the output of the second comparator.

As we have seen, the operating thresholds U1, U2 respectively of comparators 14, 18 can easily be adjusted by potentiometers 15 and 19, thus determining the quality of combustion (threshold U2).

When a signal 32 precedes a signal 33 (normal combustion) counter 21 moves forward by one unit and is subsequently reset to zero.

When a signal 33 does not immediately follow a signal 32, counter 21 moves forward by one unit and stores the absence of combustion, without being reset to zero. If n cases of this kind occur consecutively, decoder 23 generates a fault signal at its output 24.

If there is no spark, neither signal 32 nor signal 33 is given. In that case, the device shown in FIG. 3 is used. As already explained, the signal appearing at terminal 25 represents the spark (signal 32). The signal triggers a monostable multivibrator 26 which supplies a pulse having a duration D. If, during a period greater than D, no signal appears at terminal 25 (i.e. if there is no spark) detector 27 supplies a fault signal from its output 28 to operator 29.

Output signals appearing at terminals 28 and 30 are processed by operator 29, which outputs a control and/or alarm signal.

I claim:
1. An apparatus for detecting faulty combustion in an internal combustion engine having spark plugs, comprising sensing means for determining whether the gas in the interelectrode space of a spark plug is ionized following the occurrence of each spark of that plug, and means responsive to said sensing means for emitting a malfunction signal when a predetermined minimum number of consecutive sparks occur without said ionization occurring.

2. The apparatus of claim 1, wherein said sensing means includes the series combinations of a voltage source and a resistor connected between the electrodes of said spark plug, the current through said resistor after the occurrence of each spark being indicative of the degree of said ionization.

3. The apparatus of claim 2, further including means for detecting whether the magnitude of the voltage across said resistor exceeds a first predetermined threshold voltage for determining whether or not a spark has occurred.

4. The apparatus of claim 3 wherein said sensing means includes means for determining whether or not the voltage across said resistor exceeds a second predetermined threshold voltage after a voltage exceeding said first predetermined threshold voltage has been detected.

5. The apparatus of claim 4, wherein said means for emitting a malfunction signal comprises a counter means having a reset, means for advancing said counter by one count each time said first threshold is exceeded, means for resetting said counter to zero each time said second threshold is exceeded, and means for outputting said malfunction signal when said counter reaches a count equal to said predetermined minimum number.

6. The apparatus of claim 1, further including means for detecting that said spark plug has not sparked by the arrival of a time after the proper sparking time of said plug.

7. The apparatus of claim 6 wherein said means for detecting includes a re-settable one-shot multivibrator which is triggered by a voltage corresponding to the occurrence of said spark, said multivibrator having a timing duration at least slightly longer than the proper internal between sparks.

8. A method of detecting faulty combustion in a controlled ignition internal combustion engine wherein use is made of the ionization produced in the inter-electrode space of the engine spark plug, comprising the steps of;
   providing a voltage across the electrodes of said spark plug which is independent of the voltage used to produce sparking,
   generating a signal indicating that sparking has occurred,
   comparing a signal proportional to the current in said inter-electrode space immediately after sparking due to said independent voltage with a predetermined threshold signal,
   feeding said signal indicative of sparking to the input of a counting device,
   resetting to zero said counting device each time said proportional signal exceeds said reference signal, indicating that combustion is normal, and
   providing an output signal indicating the absence of a spark.

* * * * *